United States Patent

Schulz

[11] Patent Number: 5,977,752
[45] Date of Patent: Nov. 2, 1999

[54] CONTROL SIGNAL GENERATOR

[75] Inventor: Klaus-Dieter Schulz, Berlin, Germany

[73] Assignee: Fernsteuergerate Kurt Oelsch GmbH, Germany

[21] Appl. No.: 08/776,276

[22] PCT Filed: Mar. 25, 1996

[86] PCT No.: PCT/EP96/01303

§ 371 Date: Nov. 22, 1996

§ 102(e) Date: Nov. 22, 1996

[87] PCT Pub. No.: WO96/30861

PCT Pub. Date: Oct. 3, 1996

[30] Foreign Application Priority Data

Mar. 29, 1996 [DE] Germany ............... 195 11 436

[51] Int. Cl.$^6$ ............... H02K 35/00; G01B 7/14
[52] U.S. Cl. ............... 322/3; 324/207.16; 324/207.19
[58] Field of Search ............... 322/3; 273/148 B; 324/207.16, 207.19, 207.23; 74/471 XY

[56] References Cited

U.S. PATENT DOCUMENTS

| | | | |
|---|---|---|---|
| 4,654,576 | 3/1987 | Oelsch et al. | 322/3 |
| 4,667,158 | 5/1987 | Redlich | 324/207.19 |
| 4,866,378 | 9/1989 | Redlich | 324/207.19 |
| 5,107,210 | 4/1992 | Shirao et al. | 324/207.16 |
| 5,327,078 | 7/1994 | Mori | 324/207.19 |
| 5,331,277 | 7/1994 | Burreson | 324/207.16 |
| 5,394,082 | 2/1995 | Schiessle et al. | 324/207.19 |
| 5,598,090 | 1/1997 | Baker et al. | 322/3 |

FOREIGN PATENT DOCUMENTS 0399484  11/1990  European Pat. Off. .

Primary Examiner—Nestor Ramirez
Assistant Examiner—Peter Medley
Attorney, Agent, or Firm—McAfee & Taft

[57] ABSTRACT

A control signal generator for generating a plurality of control signals has a pivotally mounted control lever with an actuating member (24). Diametrically opposite sensors (28,30) have stems (40,42), which can be pushed down by the actuating field (26). Each stem (40,42) extends through a pair of induction coils (32,26;34,38). Magnetizable material (50,52) is displaced relative to the induction coils, when the stem (40,42) is pushed down. Pairs of opposite induction coils provide output signals. A comparator circuit compares the output signals of the pairs to control the unobjectionable operation of the sensors.

20 Claims, 2 Drawing Sheets

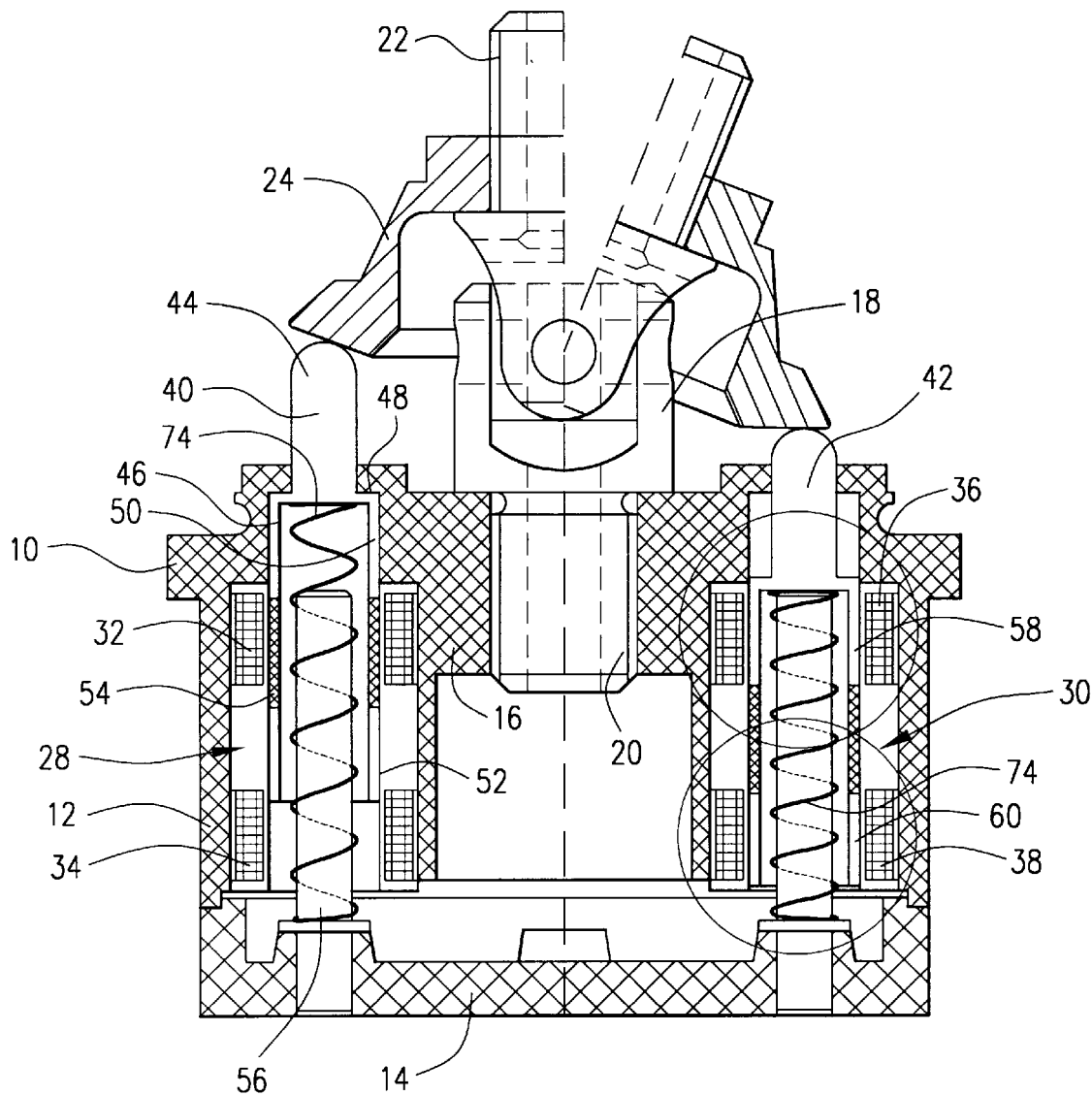
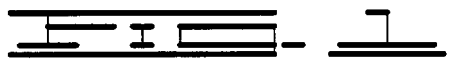

CONTROL SIGNAL GENERATOR

TECHNICAL FIELD

The invention relates to a control signal generator for generating a plurality of control signals by means of a single control lever, comprising (a) a control lever pivotally mounted by means of pivot bearing means.
(b) an actuating member rigidly attached to the control lever,
(c) at least one pair of sensors which are diametrically opposite with respect to the pivot bearing means, each sensor having a respective stem movable in a housing against the action of a spring, the actuating member being arranged to push the end of the stem protruding out of the housing down against the action of the spring,
(d) at least one pair of first induction coils, each stem extending through a respective one of the induction coils, a first section of magnetizable material being provided at each stem, this first section being displaced relative to the associated induction coil, when the stem is pushed down, and varying the inductivity of the induction coil,
(e) a circuit, which responds to variation of one induction coil of the pair of first induction coils relative to the other one and provides first output signals indicative of these variations.

PRIOR ART

EP 0,175,071 describes a control signal generator, wherein a control lever can be deflected in two directions to generate a pair of control signals. A plate is attached to the control lever about the pivot bearing. Approach sensors are mounted in a base part and respond to the movements of the plate. The approach sensors are induction coils, the inductivity of which is varied by the approach of the plate. Diametrically opposite induction coils are series connected across an a.c. voltage. A capacitor in series with a diode is connected across each of the induction coils, the capacitors being charged with opposite polarities by the voltages dropping across the induction coils. The voltages are connected in opposition to provide the control signal.

EP 0,399,484 A1 describes a control signal generator for generating a pair of control signals with a control lever universally pivoted about a pivot point by means of a pivotal bearing. A bell-shaped actuating member is attached to the control lever. Two pairs of diametrically opposite inductive sensors are arranged around the control lever, the pairs, in turn, being angularly offset by 90°. Each of the sensors contains a stem, which is arranged to be displaced in a housing against the action of a spring. When the control lever is deflected from a zero position in the direction towards the sensor, the end of the sensor protruding from the housing is pushed down by the actuating member. An induction coil is arranged in the housing, the stem extending through the induction coil. In order to ensure that, in the zero position of the control lever, the contol signal is safely zero, a cam is provided on the stem, this cam cooperating with a switch such that the control signal of the control signal generator is switched off through the contacts of the switch, when the control lever is in its zero position.

The switches and the mechanical actuating means thereof are subjected to wear. Thereby, the useful life and the reliability of the control signal generator is impaired.

DISCLOSURE OF THE INVENTION

It is the object of the invention to ensure, in a control signal generator mentioned in the beginning with a contactless, purely inductive sensor, the unobjectionable operation of the sensor.

According to the invention, this object is achieved in that
(f) each of the sensors of a pair comprises a second induction coil arranged in the housing,
(g) each stem extends through through the first and second induction coils of the associated sensor,
(h) each of the stems has a second section of magnetizable material spaced from the first section, the second section being displaced relative to the second induction coil, when the stem is pushed down, and varying, in well defined manner, the inductivity of the second induction coil as a function of displacement,
(i) a circuit which responds to variation of one induction coil of the pair of second induction coils relative to the other one and provides second output signals indicative of these variations, and
(j) a comparator circuit, which compares the first and second output signals to check the unobjectionable operation of the sensors.

Thus two control signals from two induction coils are generated. Both control signals are unambiguously dependent on the stroke of the stem. By comparing the control signals thus obtained, failures in the system can be recognized by the comparator circuit. There are no mechanically actuated switches. The sensors operate completely contactless.

Preferably, the inductivities of the second induction coil are varied as a function of the stroke to the same degree as the inductivities in the first induction coils. The inductivities may, however, be also differently dependent on the stroke, provided the dependencies are unambiguous and reproducible. An evaluation circuit can then compare even different control signals from the two induction coils and can recognize, therefrom, failures of the system, if such failures occur.

Modifications of the invention are subject matter of the dependent claims.

An embodiment of the invention is described in greater detail hereinafter with reference to the accompanying drawings.

BRIEF DESCRIPTION OF THE DRAWINGS

FIG. 1 is a longitudinal sectional view of a control signal generator having two sensors diametrically opposite with respect to the control lever, two additional sensors are arranged in identical manner in a plane perpendicular to the plane of the paper of FIG. 1.

PREFERRED EMBODIMENT OF THE INVENTION

Figure 2:
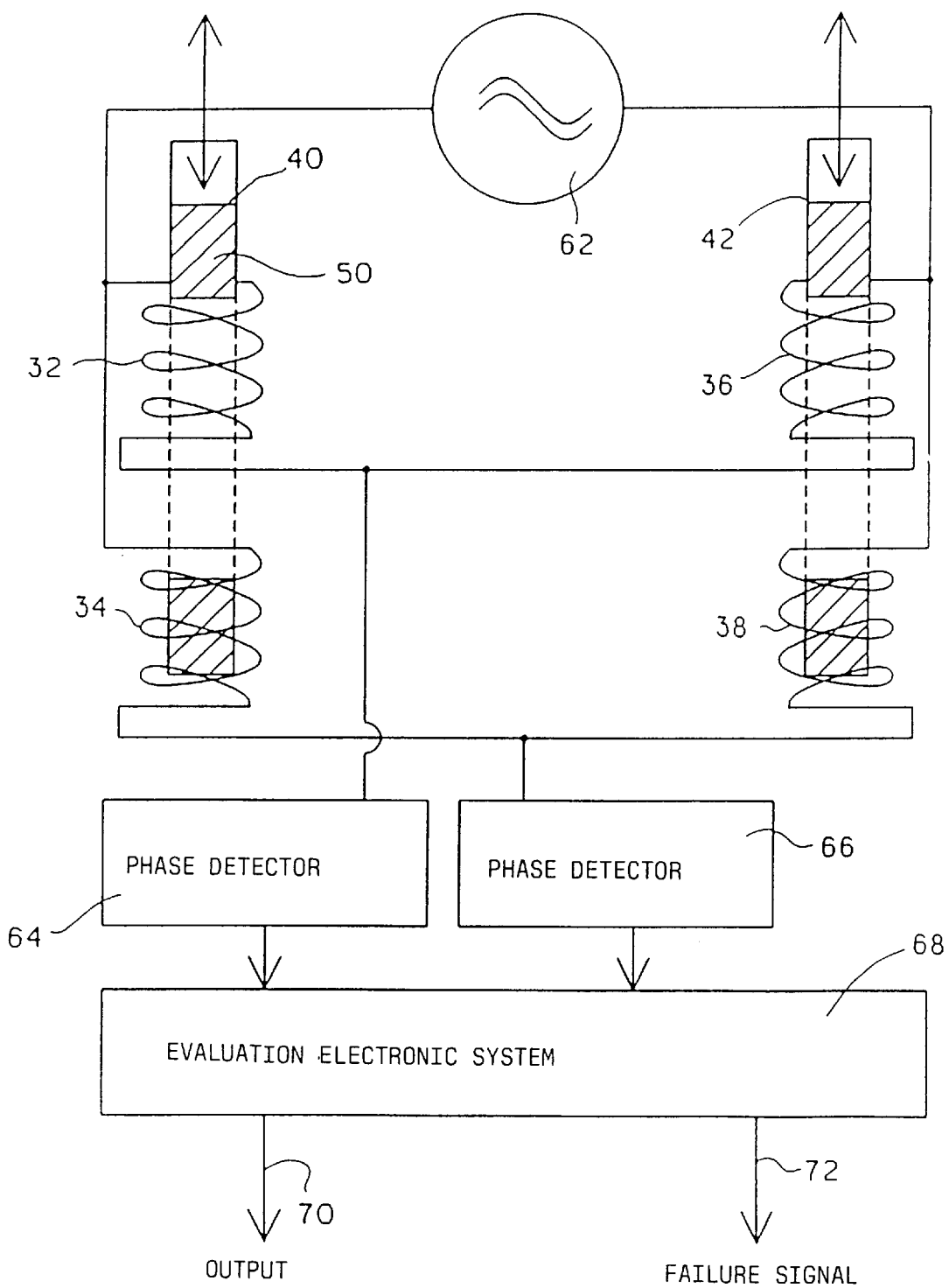
FIG. 2 schematically illustrates the associated circuit.

Referring to FIG. 1, numeral 10 designates a housing. The housing 10 consists of an inverted pot-shaped upper portion 12 and a bottom portion 14. A pivot bearing 18 in the form of a gimbal system is screwed, with a threaded shaft 20, into the "bottom" 16 of the inverted pot-shaped upper portion 14. The gimbal system supports a control lever (not shown), which can be screwed on a pin 22. A bell-shaped actuating member 24 is attached to the pin.

Two sensors 28 and 30 are mounted in the housing 10. The sensor 28 comprises two aligned, substantially identical induction coils 32 and 34. The sensor 30 comprises two aligned, substantially identical induction coils 36 and 38. Furthermore, each of the sensors 28 and 30 includes a stem 40 or 42, respectively. The rods 40 and 42 are guided in the housing for axial displacement and extend centrally through the induction coils 32 and 34, and 36 and 38, respectively. Each of the rods has a head portion 44, which protrudes from the housing. A sleeve 46 communicates with the head portion 44 and forms an annular shoulder 48 with the head portion 44. In one end position (to the left in FIG. 1), the annular shoulder 48 engages an internal surface of the housing 10, this internal surface being formed around the aperture for the head portion 44. A spring 74 urges the sleeve to the top in FIG. 1 until the annular shoulder comes into engagement with this internal surface.

The sleeve 46 consists of two sections 50 and 52 of a magnetizable material which are interconnected by a section 54 of non-magnetizable material. The distance of the sections 50 and 52 is substantially equal to the axial distance of the induction coils 32 and 34. A bolt 56 which is held in the bottom portion 14 extends centrally into the sleeve. The bolt 56 forms an inner stop for the stem 40.

As can be seen from the lefthand portion of FIG. 1, the annular shoulder 48 of the stem 40 engages the internal surface of the housing 10, when the control lever is in its zero position. The magnetizable sections 50 and 52 of the sleeve 46 are both outside the induction coils 32 and 34. There is a relatively low inductivity of the induction coils 32 and 34. Normally, however, these inductivities are equal within predetermined tolerances.

When the control lever is in its zero position, the sensor 30 is in the same state. Then the inductivities of the respective diametrically opposite induction coils are equal. Then the first coils 32 and 36 and the second coils 34 and 38 yield a respective control signal of "zero".

When the control lever is deflected to the right in FIG. 1, as illustrated in the righthand portion of FIG. 1, then the stem 42 is pushed down by the bell-shaped actuating member 24 against the action of the spring. In this situation, the stem 40 remains in its illustrated position. The actuating member simply lifts off from the stem 40. By this pushing-down, the magnetizable sections 58 and 60 of the stem 42 are moved into the induction coils 36 and 38, respectively. Thereby, the inductivities of both induction coils are increased to the same extent.

In FIG. 2, the circuit of the control signal generator is schematically illustrated.

The two first induction coils 32 and 36 of the two sensors 28 and 30, respectively, are connected in series to an a.c. voltage source 62. In parallel thereto, the two second induction coils 34 and 38 of the two sensors 28 and 30, respectively, are connected in series to the a.c. voltage source 62. The induction coils 32 and 36 are connected to a first phase detector 64. The two induction coils 34 and 38 are connected to a second phase detector 66. The phase detectors 64 and 66 provide output signals which depend on asymmetries of the inductivities of the pairs of induction coils 32 and 36, and 34 and 38, respectively. With the design of the stems illustrated in FIG. 1, the output signals of the phase detectors 64 and 66 would be substantially equal, if the sytem is intact. An evaluation electronic circuit 68 provides a control signal indicative of the deflection of the control lever, at an output 70. This control signal may, for example, be the output signal of the phase detector 64. A failure report appears at an output 72, if the output signals of the two phase detectors 64 and 66 deviate from each other by more than a predetermined tolerance.

In FIG. 2, it is indicated that the first and second induction coils not necessarily need provide identical output signals at the phase detectors 64 and 66 to permit failure monitoring.

As indicated in FIG. 2, when the stem 40 is pushed down, a magnetizable section 50 of the sleeve is moved into the induction coil 32 while simultaneously the other magnetizable section of the sleeve 40 is moved out of the induction coil. Therefore, a small inductivity of the induction coil 32 and a large inductivity of the induction coil 34 results in the zero position. As long as these relations are known, monitoring of the operation of the sensor 28 can be based also thereon. The associated values of the inductivities or of the output signals of the phase detectors 64 and 66, respectively, can, for example, be stored in a look-up table in a microprocessor of the evaluation electronic circuit 68.

The phase detectors may be of the type as shown in FIG. 6 of the initially discussed EP 0,175,071 A1.

I claim:

1. A control signal generator for generating a plurality of control signals comprising:

a housing;

an actuating member pivotally connected to said housing;

a first sensor and a second sensor positioned in said housing, each said sensor comprising:

a first induction coil;

a second induction coil aligned with and spaced from said first induction coil; and a stem extendable through said first and second induction coils, said stem comprising:

a protruding end for contacting said actuator member;

a first magnetizable section; and a second magnetizable section spaced from said first magnetizable section;

such that when said stems move in response to movement of said actuating member, said first magnetizable section and said second magnetizable section are displaced relative to said first induction coil and said second induction coil, respectively, whereby an inductivity of said induction coils is variable as a function of displacement of said stems.

2. The control signal generator of claim 1 further comprising:

first circuit means for responding to and for providing first output signals indicative of inductivity variations of said first induction coil of said first sensor relative to said first induction coil of said second sensor; and second circuit means for responding to and for providing second output signals indicative of inductivity variations of said second induction coil of said first sensor relative to said second induction coil of said second sensor.

3. The control signal generator of claim 2 further comprising comparator means for comparing said first output signal and said second output signal to test proper operation of said sensors.

4. The control signal generator of claim 3 further comprising spring means for biasing said protruding end of said stem means toward said actuating member.

5. The control signal generator of claim 4 further comprising a control lever attached to said actuating member such that said actuating member moves relative to deflections of said control lever.

6. The control signal generator of claim 5 wherein a distance between said first induction coil and said second induction coil is substantially equal to a distance between said first magnetizable section and said second magnetizable section.

7. The control signal generator of claim 6 wherein said stem of said first sensor and said stem of said second sensor engage a first stop and a second stop, respectively, as a result of said spring means when said control lever is in a zero position.

8. The control signal generator of claim 7 wherein said control signals have a value of zero in said zero position.

9. The control signal generator of claim 7 wherein said stem means of said first sensor deflects downward and said stem means of said second sensor deflects upward and engages said second stop when said control lever is deflected in a first position, and said stem means of said second sensor deflects downward and said stem means of said first sensor deflects upward and engages said first stop when said control lever is in a second position.

10. The control signal generator of claim 9 further comprising:
   first phase detector means connected to said first induction coil of said first sensor and to said first induction coil of said second sensor for generating said first output signal; and
   second phase detector means connected to said second induction coil of said first sensor and to said second induction coil of said second sensor for generating said second output signal.

11. A control signal generator for generating a plurality of control signals with a single control lever comprising:
   a housing;
   control lever means pivotally mounted to said housing;
   an actuating member attached to said control lever means;
   a pair of sensors comprising a first sensor and a second sensor, said sensors diametrically opposite with respect to said control lever means, each said sensor comprising stem means movable in said housing, said stem means having a protruding end for contacting said actuating member;
   spring means for biasing said protruding end of said stem means toward said actuating member;
   said actuating member adapted for pushing said protruding end of said stem means toward said spring means;
   each said sensor further comprising a first induction coil and a second induction coil aligned with said first induction coil, said stem means extending through said first induction coil and second induction coil;
   each said stem means comprising a first section of magnetizable material, said first section displaceable relative to said first induction coil such that an inductivity of said first induction coil is variable as a function of displacement of said stem means;
   each said stem means further comprising a second section of magnetizable material spaced from said first section, said second section displaceable relative to said second induction coil such that an inductivity of said second induction coil is variable as a function of displacement of said stem means;
   first circuit means for responding to and for providing first output signals indicative of inductivity variations of said first induction coil of said first sensor relative to said first induction coil of said second sensor;
   second circuit means for responding to and for providing second output signals indicative of inductivity variations of said second induction coil of said first sensor relative to said second induction coil of said second sensor; and
   comparator means for comparing said first output signal and said second output signal.

12. The control signal generator of claim 11 wherein a distance between said first induction coil and said second induction coil is substantially equal to a distance between said first magnetizable section and said second magnetizable section.

13. The control signal generator of claim 12, wherein, in a zero position of said control lever means, each said stem means of said pair of sensors engages a stop as a result of said spring means.

14. The control signal generator of claim 13, wherein said control signals have a value of zero in said zero position.

15. The control signal generator of claim 13, wherein:
   said control lever means is deflectable in a first position and in a second position such that when said control lever means is deflected in said first position said stem means of said second sensor deflects upward and engages said stop, and when said control lever means is deflected in said second position said stem means exchange positions such that said stem means of said second sensor deflects downward and said stem means of said first sensor deflects upward and engages said stop;
   first phase detector means connected to said first induction coil of said first sensor and to said first induction coil of said second sensor for generating said first output signal; and
   second phase detector means connected to said second induction coil of said first sensor and to said second induction coil of said second sensor for generating said second output signal.

16. The control signal generator of claim 15 wherein a failure is indicated if said first output signal and said second output signal deviate by more than a predetermined tolerance.

17. A control signal generator for generating a plurality of control signals by means of a single control lever, comprising:
   a housing;
   control lever means for controlling said control signals;
   pivot bearing means for pivotally mounting said control lever means in said housing;
   an actuating member rigidly attached to said control lever means;
   a pair of sensors comprising a first sensor and a second sensor which are diametrically opposite with respect to said pivot bearing means;
   each said sensor having a respective stem means movable in said housing, each of said stem means having a protruding end facing said actuating member;
   spring means acting on said stem means for urging said protruding end of said stem means to protrude out of said housing;
   said actuating member being arranged to push said protruding end of said stem means protruding out of said housing down against the action of said spring;
   each of said sensors of said pair of sensors comprising a first induction coil and a second induction coil aligned therewith, each said stem means extending through said first and second induction coils of the associated sensor;
   each of said stem means comprising a first section of magnetizable material, said first section being displaceable relative to the associated first induction coil when said stem means is pushed down such that an inductivity of said first induction coil is variable;
   each of said stem means having a second section of magnetizable material spaced from said first section, said second section being displaceable relative to said second induction coil when said stem means is pushed down such that inductivity of said second induction coil is variable in a defined manner as a function of displacement;

first circuit means for responding to variations of said first induction coil of said first sensor relative to said first induction coil of said second sensor, said first circuit means providing a first output signal indicative of said variations;

second circuit means for responding to variations of said second induction coil of said first sensor relative to said second induction coil of said second sensor, said second circuit means providing a second output signal indicative of said variations; and a comparator means for comparing said first and second output signals to check the unobjectionable operation of said sensors.

18. A control signal generator as claimed in claim 17, wherein, in a zero position of said control lever means, each said stem means of said pair of sensors engages a stop under the action of said spring means.

19. A control signal generator as claimed in claim 18, wherein said control signals have a value of zero in said zero position.

20. A control signal generator as claimed in claim 18, wherein:

when said control lever means is deflected in one direction, said actuating member pushes down said stem means of said first sensor and releases said stem means of said second sensor whereby said stem means of said second sensor engages its respective stop, and when said control lever means is deflected in an opposite direction, said actuating member pushes down said stem means of said second sensor and releases said stem means of said first sensor whereby said stem means of said first member engages its respective stop;

first and second phase detector means;

said first induction coils of said sensors of said pair are interconnected in said first phase detector means to generate said first output signal; and said second induction coils of said sensors of said pair are interconnected in said second phase detector means to generate said second output signal.

\* \* \* \* \*